(12) United States Patent
Schonwald et al.

(10) Patent No.: US 10,740,489 B2
(45) Date of Patent: Aug. 11, 2020

(54) SYSTEM AND METHOD FOR PREDICTION PRESERVING DATA OBFUSCATION

(71) Applicant: JPMorgan Chase Bank, N.A., New York, NY (US)

(72) Inventors: Carter Tazio Schonwald, New York, NY (US); Graham L. Giller, Holmdel, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 170 days.

(21) Appl. No.: 15/982,504

(22) Filed: May 17, 2018

(65) Prior Publication Data
US 2018/0336370 A1 Nov. 22, 2018

Related U.S. Application Data

(60) Provisional application No. 62/507,382, filed on May 17, 2017.

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC .............................. G06F 21/62; G06F 21/602
See application file for complete search history.

(56) References Cited

U.S. PATENT DOCUMENTS

| 9,635,011 | B1* | 4/2017 | Wu | H04L 63/0807 |
| 2016/0140425 | A1* | 5/2016 | Kulkarni | G06K 9/4628 |
| | | | | 382/159 |
| 2017/0250796 | A1* | 8/2017 | Samid | H04L 9/0838 |
| 2019/0007390 | A1* | 1/2019 | Wu | H04L 9/0861 |

OTHER PUBLICATIONS

J. Willey, H. Szu, and M. Zaghloul, Conditional Entropy Minimization in Neural Network Classifiers, Jul. 1999 added to IEEE xplorer: Aug. 2002, IJCNN'99 (International Joint Conference in Neural Networks), Proceedings (Cat. No. 99CH36) (Year: 1999).*
F. W. Huffer and L. A. Shepp, On the probability of Covering the Circle by Random Arcs, Jun. 1987, Journal of Applied Probability, vol. 24, No. 2, pp. 422-429 (Year: 1987).*
Svante Janson, Random Coverings in Several Dimentions, Mar. 1986, Uppsala University (Year: 1986).*
J. Koushik and H. Hayashi, Improving Stotastic Gradient Descent with Feedback, 2016, Language Technologies Institue, Carnegie Mellon University (Year: 2016).*

* cited by examiner

*Primary Examiner* — Kambiz Zand
*Assistant Examiner* — Arezoo Sherkat
(74) *Attorney, Agent, or Firm* — Hunton Andrews Kurth LLP

(57) ABSTRACT

The invention relates to obfuscating data while maintaining local predictive relationships. An embodiment of the present invention is directed to cryptographically obfuscating a data set in a manner that hides personally identifiable information (PII) while allowing third parties to train classes of machine learning algorithms effectively. According to an embodiment of the present invention, the obfuscation acts as a symmetric encryption so that the original obfuscating party may relate the predictions on the obfuscated data to the original PII. The various features of the present invention enable third party prediction services to safely interact with PII.

18 Claims, 7 Drawing Sheets

SYSTEM AND METHOD FOR PREDICTION PRESERVING DATA OBFUSCATION

CROSS REFERENCE TO RELATED APPLICATIONS

The application claims priority to U.S. Provisional Application 62/507,382, filed May 17, 2017, the contents of which are incorporated herein in its entirety.

FIELD OF THE INVENTION

The present invention relates generally to a system and method for obfuscating data while maintaining local predictive relationships.

BACKGROUND OF THE INVENTION

Personally identifiable information (PII) generally refers to information that can be used to identify, contact or locate a person as well as identify an individual in context. Such information may include medical, educational, financial, legal, employment records and other personal data. Because personally identifiable information is valuable, organizations are required to protect personally identifiable information of its employees, members or customers to avoid risks and improper use of such data.

Generally, protecting PII may involve various safeguarding techniques, including a combination of encryption, threat protection, data-loss prevention and policy compliance. Organizations may also be required to set rules and protocols regarding access to the data, how the data is received, stored and transmitted, what information can be sent within the organization and what can be passed along to third parties.

While current systems focus on protecting such data, there is currently no way to preserve enough structure so that certain classes of machines or prediction models could use the protected data.

These and other drawbacks exist.

SUMMARY OF THE INVENTION

According to one embodiment, the invention relates to a system for obfuscating data. The system comprises: a memory component that stores personally identifiable information; a communication interface; and a computer processor, coupled to the memory component and the communication interface, configured to perform the steps of: retrieving a dataset of the personally identifiable information where the personally identifiable information is to be obfuscated; identifying a set of security parameters for the dataset; identifying a random covering for the dataset; applying a random permutation to the dataset; and generating obfuscated data representing the dataset.

According to another embodiment, a system for data obfuscation comprises: a memory component that stores personally identifiable information; a communication interface; and a computer processor, coupled to the memory component and the communication interface, configured to perform the steps of: retrieving a dataset of the personally identifiable information where the personally identifiable information is to be obfuscated; identifying a security parameter for the dataset; dividing the dataset into a plurality of bins based on the security parameter; shuffling the bins based on a random permutation; and composing obfuscated data, wherein the obfuscated data is used to train a machine learning algorithm.

According to another embodiment, a method for data obfuscation comprises the steps of: retrieving, via a communication interface, a dataset of the personally identifiable information where the personally identifiable information is to be obfuscated; identifying, via a computer processor, a set of security parameters for the dataset; identifying, via the computer processor, a random covering for the dataset; applying, via the computer processor, a random permutation to the dataset; and generating, via the computer processor, obfuscated data representing the dataset.

The system may include a specially programmed computer system comprising one or more computer processors, interactive interfaces, electronic storage devices, and networks.

The computer implemented system, method and medium described herein provide unique advantages to entities, organizations, third party prediction providers and customers, according to various embodiments of the invention. The innovative system and method for obfuscating data allows for safe transmission of personally identifiable data. Moreover, the system and method provides the ability to train classes of machine learning algorithms effectively. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to cryptographically obfuscating a data set in a manner that hides personally identifiable information (PII) while allowing third parties to train classes of machine learning algorithms effectively. According to an embodiment of the present invention, the obfuscation acts as a symmetric encryption so that the original obfuscating party may relate the predictions on the obfuscated data to the original PII. Accordingly, the various features of the present invention enable third party prediction services to safely interact with PII. Third party services may involve predictive modelling and analytics competitions as well as producing the models for predicting and describing datasets uploaded by companies and users.

An embodiment of the present invention enables third parties to develop code that learns predictive relationships between feature data and dependent data without the third parties being able to discern the actual functional relationship between the features and the dependent variable.

Figure 1:
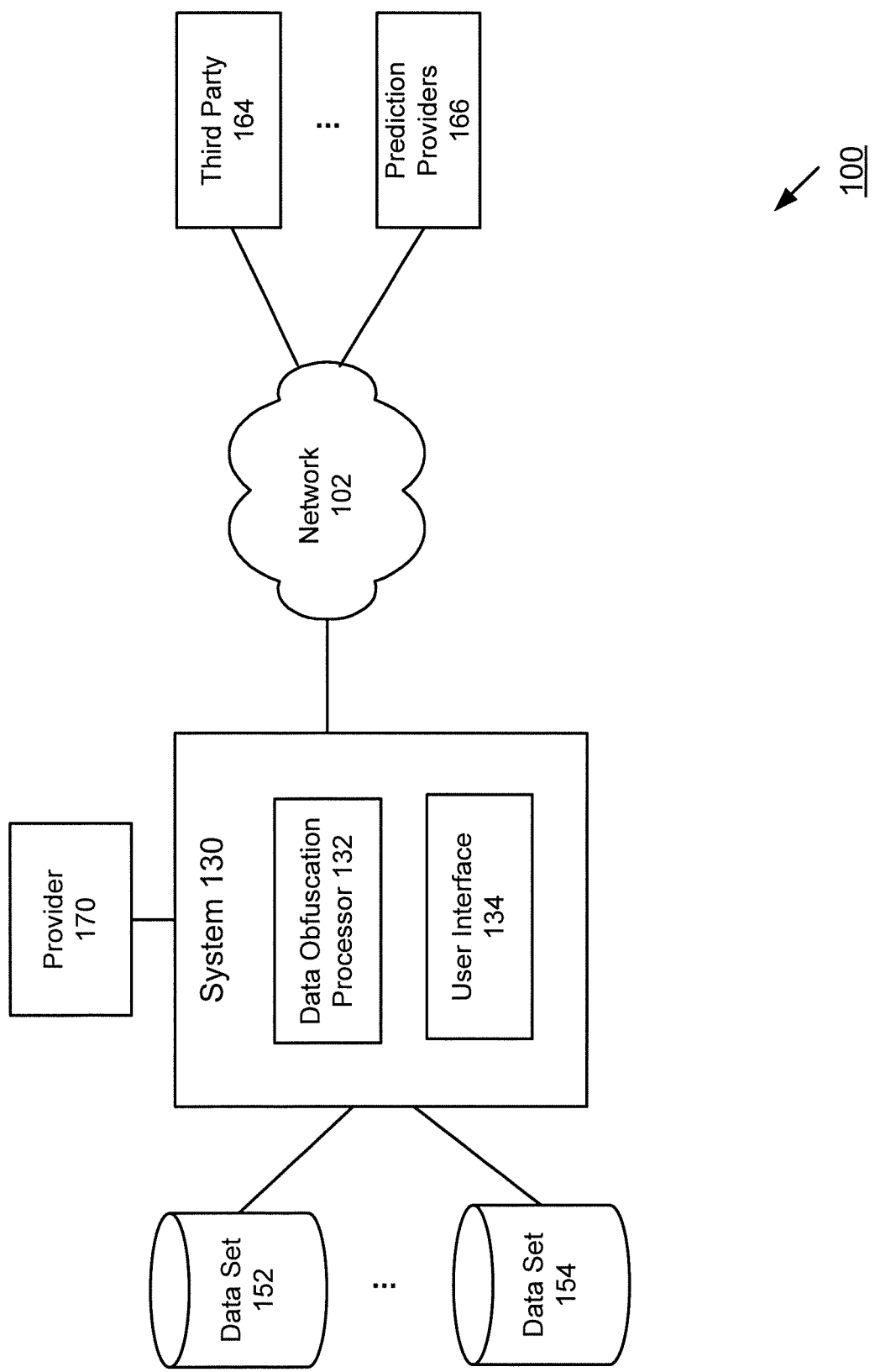
FIG. 1 illustrates a schematic diagram of a system that provides data obfuscation, according to an embodiment of the present invention.

FIG. 1 illustrates a schematic diagram of a system that provides data obfuscation, according to an embodiment of the present invention. An embodiment of the present invention is directed to obfuscating data while maintaining local predictive relationships. This enables the ability to apply the obfuscated data to prediction systems to generate useful outputs and results.

As shown in FIG. 1, System 130 may include Data Obfuscation Processor 132 that cryptographically obfuscates a data set while providing the ability to effectively train classes of machine learning algorithms. For example, System 130 may provide obfuscated data that may be used by third party prediction providers (e.g., Third Party 164, Prediction Providers 166, etc.) for various applications, including machine learning tools, etc. For example, an embodiment of the present invention may use machine learning to create a proprietary market impact model as a function of order data. According to an exemplary application, an embodiment of the present invention may use machine learning to estimate the relationship between bank account metrics and propensity to take on an unsecured loan. Accordingly, the various features of the present invention enable third party prediction services to safely interact with PII. System 130 may be associated with Provider 170 which may represent various entities, intermediaries, third party providers, etc.

Data Obfuscation Processor 132 may also incorporate modules and other functions, such as User Interface 134. These modules are exemplary and illustrative. Data Obfuscation Processor 132 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Data Obfuscation Processor 132 may be implemented in various systems and platforms to provide data obfuscation in accordance with the various embodiments of the present invention. System 130 may represent any company, service or product provider, financial institution, or other entity that may be responsible for personally identifiable information and/or other sensitive user/customer data. System 130 may access various Data Sets represented by 152, 154, which may represent local and/or remote sources of data. These storage components may include any suitable data structure to maintain the information and allow access and retrieval of the information. For example, the storage components may keep the data in an organized fashion. The storage may be local, remote, or a combination. Communications with the storage components may be over a network or communications may involve a direct connection between the various storage components and System 130, as depicted in FIG. 1. The storage components may also represent cloud or other network based storage.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 400 may be referenced in explaining the exemplary methods described herein.

Network 102 may be a wireless network, a wired network or any combination of wireless network and wired network. Also, Network 102 may support an Internet network, a wireless communication network, a cellular network, Bluetooth, or the like, or any combination thereof. Although Network 102 is depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks. Data may be transmitted and received via Network 102 utilizing a standard networking protocol or a standard telecommunications protocol.

While FIG. 1 illustrates individual devices or components, it should be appreciated that there may be several of such devices to carry out the various exemplary embodiments. Data Obfuscation Processor 132 may be accessed using any mobile or computing device, such as a laptop computer, a personal digital assistant, a smartphone, a smartwatch, smart glasses, other wearables or other computing devices capable of sending or receiving network signals. Customer devices may have an application installed that is associated with System 130.

Figure 2:
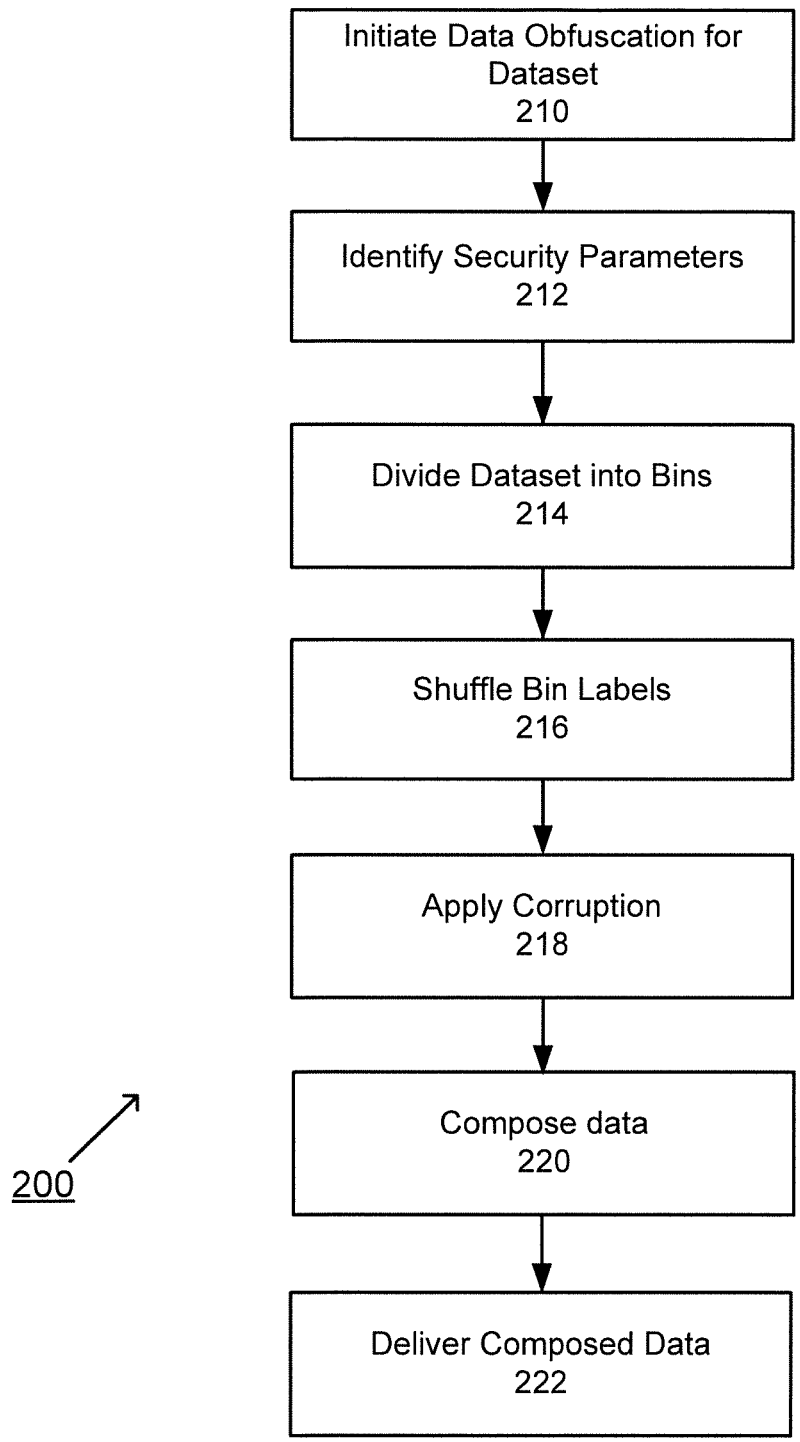
FIG. 2 is an exemplary flowchart of a method for data obfuscation, according to an embodiment of the present invention.

FIG. 2 is an exemplary flowchart of a method for data obfuscation, according to an embodiment of the present invention. At step 210, data obfuscation for a dataset may be initiated. At step 212, security parameters may be identified. The security parameter may be identified as $\beta$. At 214, the dataset may be divided into $\beta$ bins. At step 216, the bin labels may be shuffled. At step 218, a measure of corruption may be applied. At step 220, the data may be composed. At step 222, the composed data may be delivered to a third party. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The steps of FIG. 2 are explained in further detail below.

At step 210, a process to initiate data obfuscation to a dataset may be initiated. The data set may be specific to a particular line of business. The data set may be from a local repository and/or remote sources of data. The process may be automatically initiated or based on a predetermined schedule.

At step 212, a security parameter may be identified. The security parameter may be identified as β. In addition, the security parameter may represent a security level. The security parameter or level represents the difficulty in reconstructing the data. According to another example, an embodiment of the present invention may apply keyed hashing methodology. An embodiment of the present invention may implement keyed hashing methodologies to permit members of a predictive crowd to simultaneously develop multiple predictive methods on the same data without having the ability to compare data sets. In addition, the algorithm may suffer from "aliasing" effects at "bin edges." The use of a predictive crowd may act to remove these effects by allowing the data owner, who sees un-obfuscated data, to aggregate multiple solutions together. This may be similar to a "bagging" or "bootstrap aggregation" methodology.

An embodiment of the present invention may provide time-series analysis for a situation where the "within bin" scrambling action is omitted. This may be similar to use of "block bootstrap" methods in modern statistics.

For predictive relationships, a representative N observations may be made of data (X,Y), where an entire set of predictors is represented by X and dependent variables are represented by Y. In this scenario, a predictive relationship Y(X) may be estimated from data, which may be represented as: $\lim_{N \to \infty} \Sigma |Y(X) - \hat{Y}(X|X,Y)| \to 0$ where $\hat{Y}(X|X,Y)$ which is a predictive function composed from observed data. The predictive function may ultimately reproduce the true relationship.

For obfuscation of data, an obfuscation scheme $X \to \tilde{X}(X)$ with standard "public key cryptographic" property may be implemented. In this example, B(N)>>F(N) where F(N) represents to amount of computation required to compute $\tilde{X}(X)$ and B(N) represents the amount of computation required to compute the reverse mapping $\tilde{X} \to X(\tilde{X})$. The obfuscation is essentially a "one way function." Also, the system may optionally additionally obfuscate the dependent variables: $Y \to \tilde{Y}(Y)$.

For obfuscated prediction, an embodiment of the present invention may identify and implement a obfuscated predictor $\hat{Z}(\tilde{X}|\tilde{X}, Y)$ which converges in some suitable limit to the unobfuscated predictor. For example, $\lim_{N \to \infty} \Sigma |\hat{Z}(\tilde{X}|\tilde{X},Y) - \hat{Y}(X|X,Y)| \to 0$. The obfuscated predictor may ultimately make the same predictions as the unobfuscated predictor. Also, the system may optionally seek $\hat{Z}(\tilde{X}|\tilde{X},\tilde{Y})$ with the same property. Other variations may be implemented.

At 214, the dataset may be divided into β bins. The bins may be overlapping or non-overlapping bins and identified as $b_i$. Each bin may be labeled. For example, the security parameter may be used to split the dataset. For example, the security parameter may be a 128 bit security. The dataset may be split into 128 regions.

According to an exemplary illustration, a true feature space may be divided into a compact set of β non-overlapping bins, $b_L$, such that the entire observed data set is contained within $U_{i=1}^{B} b_i$. There are K=N/β data points per bin. In an exemplary embodiment, β is chosen to be the smallest factor of N such that $$\beta \geq N^{\frac{3}{4}}.$$

At step 216, the bin labels may be shuffled. The bin labels may be shuffled by a random permutation i→j such that the datapoints in bin $b_j$ are actually those from bin $b_i$. According to a first option, within each bin, the observed data themselves may also be randomly relabeled. According to a second option, the dependent variables may also be shuffled in a similar manner.

At step 218, a measure of corruption may be applied. This may involve rearranging the data in each bin. According to another example, each bin may be adjusted or resealed based on a ratio of data associated with each bin.

At step 220, the data may be composed.

At step 222, the composed data may be delivered to a third party for training a machine learning application. For example, the system may provide the ability to learn predictive relationships between feature data and dependent data. In addition, the obfuscated data may be used to train machine learning algorithms. This information may be used to generate models as well as generate predictions.

For example, the newly composed data may be delivered to a third party who infers the predictive function $\hat{Z}(\tilde{X}|\tilde{X},Y)$, or $\hat{Z}(\tilde{X}|\tilde{X},\tilde{Y})$ if the second option is implemented. Only with knowledge of the true shuffles done is it possible for the data owner to map the predictive function from the obfuscated space back into the unobfuscated space, e.g., only the data owner may compute $\hat{Y}(\hat{Z})$.

Figure 3:
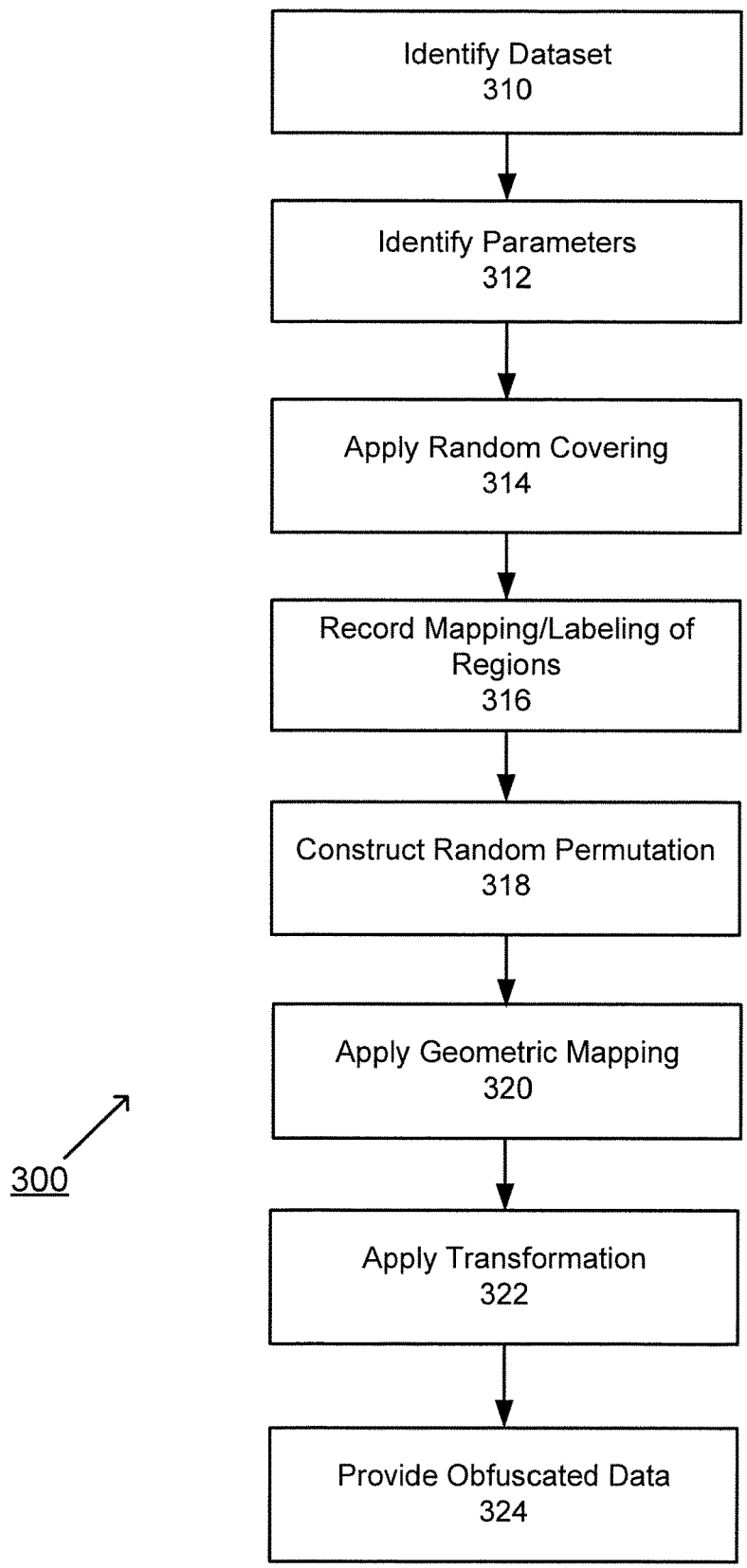
FIG. 3 is an exemplary flowchart of a method for data obfuscation via a shuffling algorithm, according to an embodiment of the present invention.

FIG. 3 is an exemplary flowchart of a method for data obfuscation via a shuffling algorithm, according to an embodiment of the present invention. FIG. 3 illustrates a specific exemplary application of data obfuscation, other algorithms may be applied. At step 310, a dataset may be identified. At step 312, parameters may be identified for the dataset. At step 314, a random covering may be identified. At step 316, mapping and/or labelling of regions may be recorded. At step 318, the system may construct random permutations on the regions. At step 320, the system may apply geometric mapping to rescale and shift. At step 322, a transformation may be applied to data points. At step 324, the resulting obfuscated data may be provided to third parties for various applications. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. The steps of FIG. 3 are explained in further detail below.

At step 310, a dataset may be identified. This ensures that there is sufficient data.

At step 312, parameters may be identified for the dataset. For example, the system may select hyper parameters K where K represents an integer as a security parameter. Epsilon parameter may represent a probability of a shuffle corruption for the data set. The dataset may have N points in a D dimensional feature space so the points live in a compact convex hull generated by the N distinct D dimensional real number valued vectors that may serve as input data.

As K and Epsilon increase, an expected difficulty of breaking the protocol may also increase. In this scenario, an accuracy of possible predictions may decrease. According to an exemplary embodiment, K may be at least Log_2 N (log base 2 of N) and less than N.

At step 314, a random covering may be identified using D dimensional hyper rectangles of convex hull of N points. For example, the system may select a random covering using D dimensional hyper rectangles of a convex hull of N-points such that a distribution of points across the K hyper rectangles approximately minimizes an entropy of the mapping to these regions. Notably, if every region has exactly N/K points, that would optimally minimize entropy.

At step 316, mapping and/or labelling of regions may be recorded.

At step 318, the system may construct random permutations on the regions. For example, the system may construct random permutation P on K regions or region labels. This permutation may induce an easy to compute geometric mapping between the K hyper rectangles that rescales and shifts a point from the corresponding coordinates in one region to the other, at step 320. In addition to the scaling and translation, the system may also add a choice of D dimensional rotation to the mapping, which may be randomly selected but fixed for each pair of hyper rectangle mappings. For points that lie on the boundary along two (or more) hyper rectangles, the choice of which incident mapping should be used may be chosen uniformly at random.

At step 322, a transformation may be applied to data points. The transformation may be applied to the data points, for each vector/data record, with probability Epsilon to corrupt the permutated hyper rectangle assignment.

For example, if K represents a prime number, the hyper rectangle region labels may be identified with the numbers 0,1 through K−1 inclusive. One secure choice of corruption distribution may be the discrete Gaussian on a finite field of characteristic K (e.g., equivalently a Cyclic additive group of order K) with a variance suitably scaled.

In accordance with the various embodiments of the present invention, other convex families of shapes aside from Hyper Rectangles may be used. Hyper rectangles are merely one example for illustration purposes. Other shapes may include hyper cubes, spheres, etc.

At step 324, the resulting obfuscated data may be provided to third parties for various applications and uses.

FIGS. 4-7 provide illustrations of functional relationships, according to an embodiment of the present invention.

Figure 4:
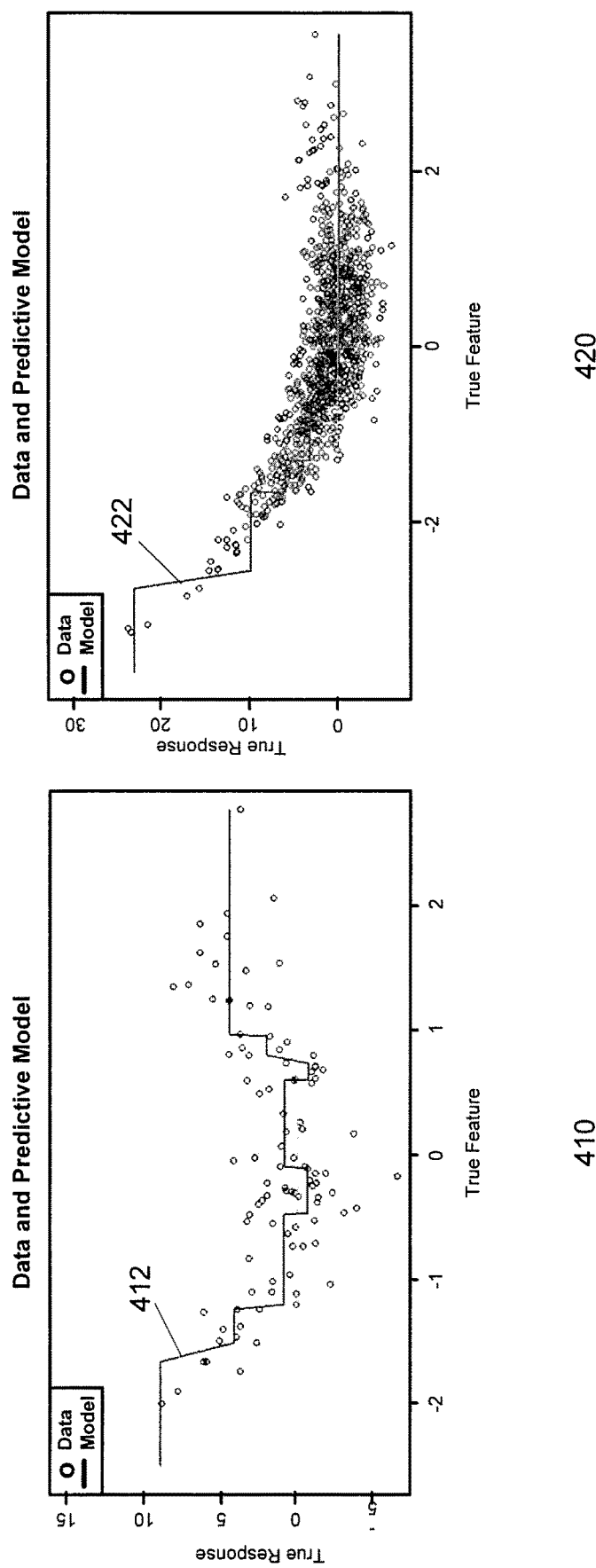
FIG. 4 is an exemplary illustration of transparent analytics, according to an embodiment of the present invention.

FIG. 4 is an exemplary illustration of transparent analytics, according to an embodiment of the present invention. As shown in 410 and 420, functional relationship between variables is discoverable by analysts. Graphs 410 and 420 illustrate data and predictive models at 412 and 422, respectively.

Figure 5:
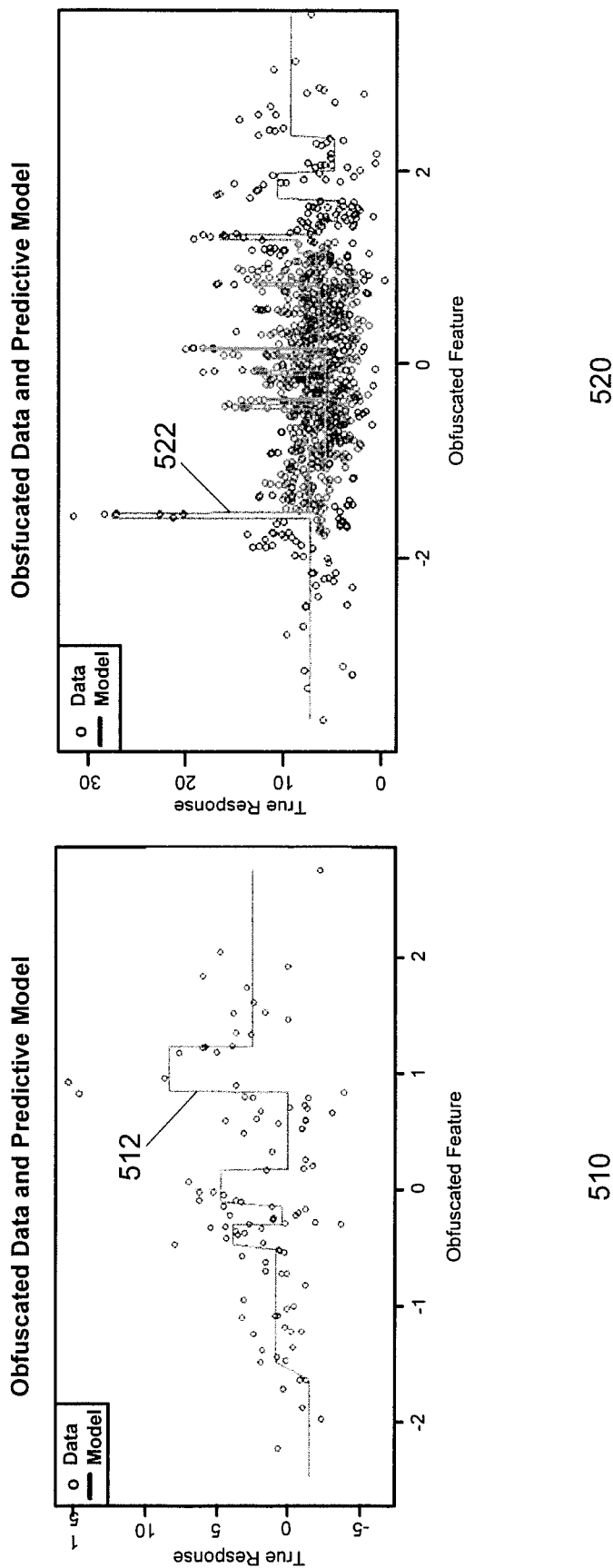
FIG. 5 is an exemplary illustration of obfuscated analytics, according to an embodiment of the present invention.

FIG. 5 is an exemplary illustration of obfuscated analytics, according to an embodiment of the present invention. As shown in 510 and 520, functional relationship between variables is hidden from analysts. Graphs 510 and 520 illustrate obfuscated data and predictive models at 512 and 522, respectively.

Figure 6:
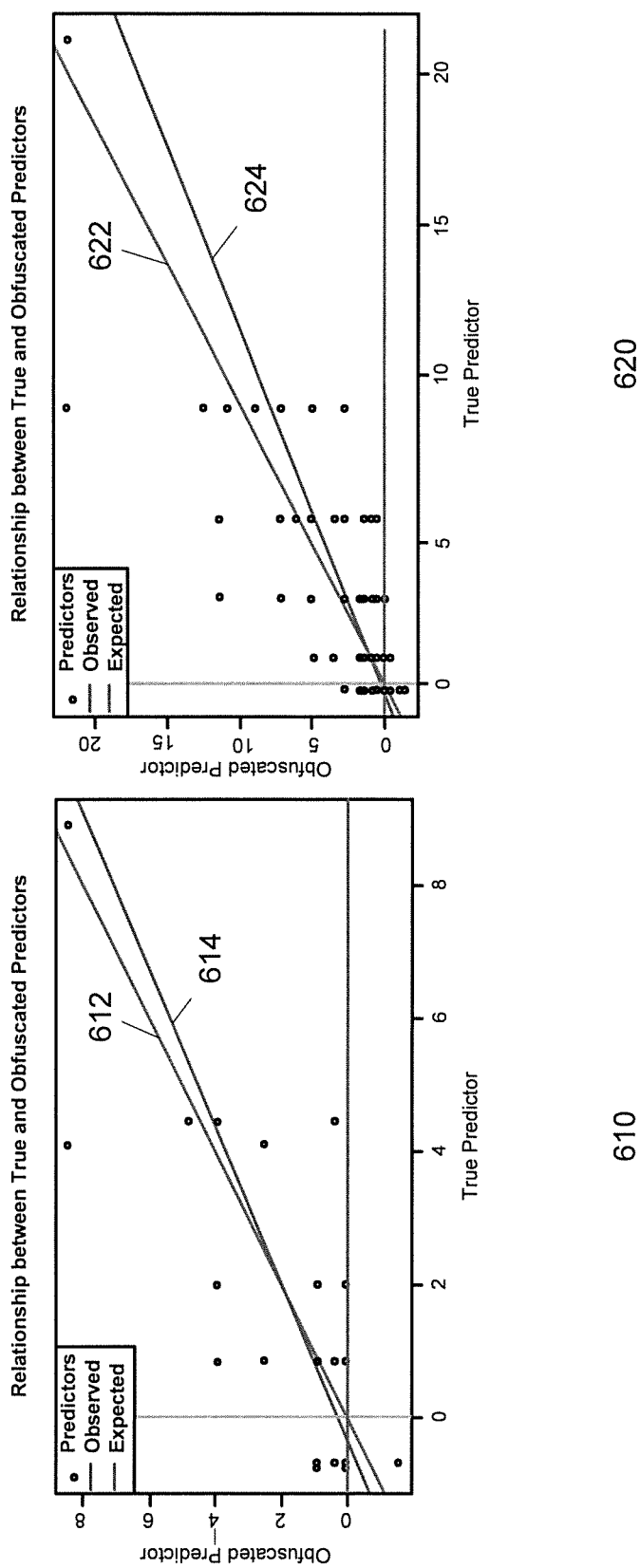
FIG. 6 is an exemplary illustration of a relationship between transparent and obfuscated predictors, according to an embodiment of the present invention.

FIG. 6 is an exemplary illustration of a relationship between transparent and obfuscated predictors, according to an embodiment of the present invention. As shown in 610 and 620, the relationship is illustrated as a straight line with gradient 1. Graphs 610 and 620 illustrate a relationship between true and obfuscated predictors. The error between true and obfuscated predictors may converge to zero on large samples. In graph 610, line 612 represents expected data and line 614 represents observed data. In graph 620, line 622 represents expected data and line 624 represents observed data.

Figure 7:
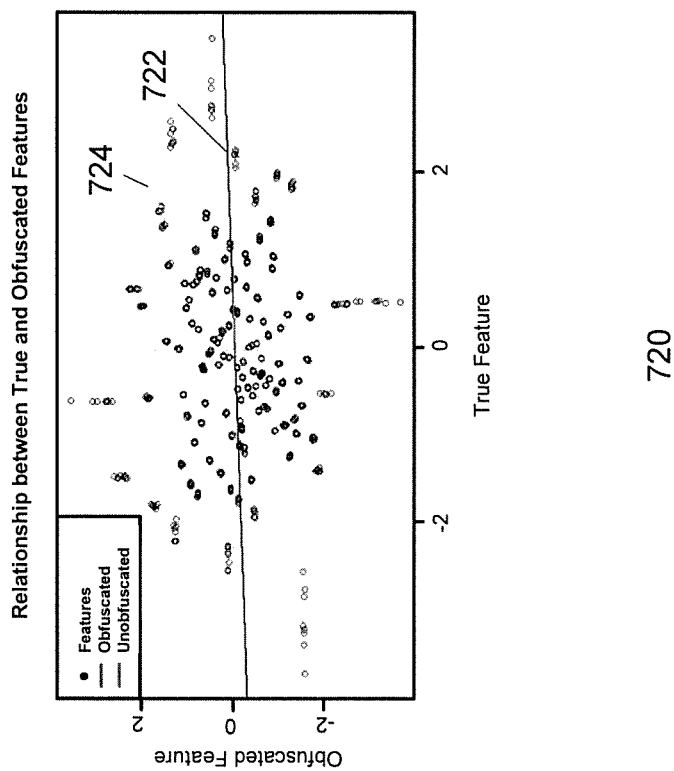
FIG. 7 is an exemplary illustration of a functional relationship between original and obfuscated features, according to an embodiment of the present invention.
Figure 7:
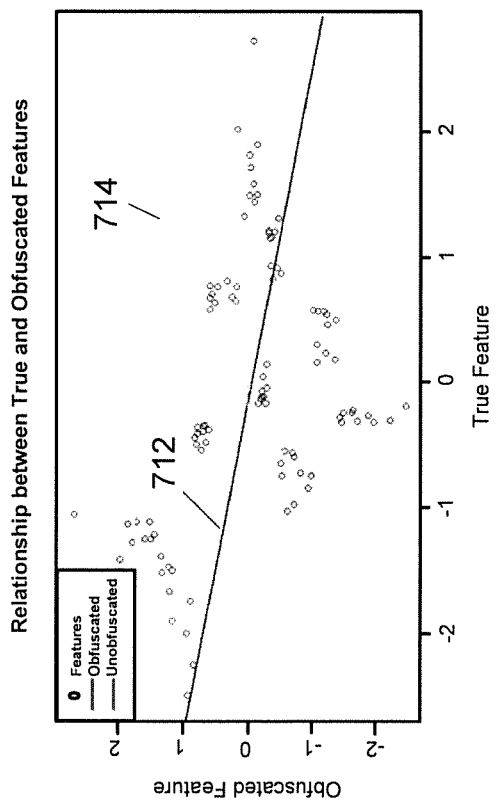

FIG. 7 is an exemplary illustration of a functional relationship between original and obfuscated features, according to an embodiment of the present invention. There should be no observable relationship. 710 and 720 illustrate the relationship between true and obfuscated features. An error between true and obfuscated features may exist. In graph 710, line 712 represents obfuscated data and 714 represents unobfuscated data. In graph 720, line 722 represents obfuscated data and 724 represents unobfuscated data.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for data obfuscation comprising:
   a memory component that stores personally identifiable information;
   a communication interface; and
   a computer processor, coupled to the memory component and the communication interface, configured to perform the steps of:
   retrieving a dataset of the personally identifiable information where the personally identifiable information is to be obfuscated;
   identifying a set of security parameters for the dataset, wherein the set of security parameters comprises hyper parameters and an epsilon parameter that represents a probability of a shuffle corruption for the dataset;
   identifying a random covering for the dataset;
   applying a random permutation to the dataset; and
   generating obfuscated data representing the dataset.

2. The system of claim 1, wherein the dataset comprises N points in a D dimensional feature space.

3. The system of claim 1, wherein the random covering is identified using D dimensional hyper rectangles of convex hull of N points.

4. The system of claim 3, wherein the computer processor is further configured to perform the step of:
   applying a geometric mapping between K hyper rectangles that rescales and shifts a point from a corresponding coordinate in a first region to a second region.

5. The system of claim 1, wherein the computer processor is further configured to perform the step of:
   applying a transformation to the data set.

6. The system of claim 1, wherein the obfuscated data is used to train a machine learning algorithm.

7. A system for data obfuscation comprising:
   a memory component that stores personally identifiable information;
   a communication interface; and
   a computer processor, coupled to the memory component and the communication interface, configured to perform the steps of:
   retrieving a dataset of the personally identifiable information where the personally identifiable information is to be obfuscated;
   identifying a security parameter for the dataset, wherein the security parameter comprises hyper parameters and an epsilon parameter that represents a probability of a shuffle corruption for the dataset;
   dividing the dataset into a plurality of bins based on the security parameter;
   shuffling the bins based on a random permutation; and
   composing obfuscated data, wherein the obfuscated data is used to train a machine learning algorithm.

8. The system of claim 7, wherein the plurality of bins are overlapping bins.

9. The system of claim 7, wherein the plurality of bins are non-overlapping bins.

10. The system of claim 7, wherein the computer processor is further configured to perform the step of:

adjusting each bin based on a ratio of data associated with each bin.

11. The system of claim 7, wherein within each bin, observed data is also randomly re-labeled.

12. The system of claim 7, wherein one or more dependent variables are also shuffled in a random manner.

13. A method for data obfuscation comprising the steps of:
retrieving, via a communication interface, a dataset of the personally identifiable information where the personally identifiable information is to be obfuscated;
identifying, via a computer processor, a set of security parameters for the dataset, wherein the set of security parameters comprises hyper parameters and an epsilon parameter that represents a probability of a shuffle corruption for the dataset;
identifying, via the computer processor, a random covering for the dataset;
applying, via the computer processor, a random permutation to the dataset; and
generating, via the computer processor, obfuscated data representing the dataset.

14. The method of claim 13, wherein the dataset comprises N points in a D dimensional feature space.

15. The method of claim 13, wherein the random covering is identified using D dimensional hyper rectangles of convex hull of N points.

16. The method of claim 15, further comprising the step of:
applying a geometric mapping between K hyper rectangles that rescales and shifts a point from a corresponding coordinate in a first region to a second region.

17. The method of claim 13, further comprising the step of:
applying a transformation to the data set.

18. The method of claim 13, wherein the obfuscated data is used to train a machine learning algorithm.

* * * * *